United States Patent [19]
Denoize et al.

[11] Patent Number: 5,414,631
[45] Date of Patent: May 9, 1995

[54] COLLISION-AVOIDANCE DEVICE FOR AIRCRAFT, NOTABLY FOR AVOIDING COLLISIONS WITH THE GROUND

[75] Inventors: Xavier Denoize; François Faivre, both of St. Medard, France

[73] Assignee: Sextant Avionique, Meduon la Foret, France

[21] Appl. No.: 149,185

[22] Filed: Nov. 8, 1993

[30] Foreign Application Priority Data

Nov. 10, 1992 [FR] France .................. 92 13529

[51] Int. Cl.⁶ .............................................. G08G 5/04
[52] U.S. Cl. ........................................ 364/461; 340/963
[58] Field of Search ............ 364/461, 451, 449, 433; 340/970, 961, 963; 244/180, 181, 186; 342/357, 462, 65

[56] References Cited

U.S. PATENT DOCUMENTS

| | | | |
|---|---|---|---|
| 4,144,571 | 3/1977 | Webber | 364/450 |
| 4,433,323 | 2/1984 | Grove | 340/970 |
| 4,646,244 | 2/1987 | Bateman et al. | 364/461 |
| 4,760,396 | 7/1988 | Barney et al. | 342/65 |
| 4,924,401 | 5/1990 | Bice et al. | 364/433 |
| 5,142,480 | 8/1992 | Morrow | 364/452 |

FOREIGN PATENT DOCUMENTS

4315084 6/1992 Japan .
2144007 2/1985 United Kingdom .

OTHER PUBLICATIONS

Preistly, Neal "Terraine Referenced Navigation," IEEE Plans '90 Position Location and Navigation Symposium, pp. 482-489 (1990).

Primary Examiner—Michael Zanelli
Attorney, Agent, or Firm—Meltzer, Lippe, Goldstein, Wolf, Schlissel & Sazer

[57] ABSTRACT

A device for avoiding aircraft collisions with the ground determines the geographical location of the aircraft, and has a data base containing a description of safety altitudes for the geographical location. From the geographical location and the description of safety altitudes, the collision-avoidance device computes an air floor about the vertical of the aircraft. The altitude of the floor is greater than or equal to the safety altitudes about this vertical. In addition, the collision-avoidance device predicts the air position of the aircraft and compares this situation with the air floor. An alarm sounds when the aircraft passes beneath the floor.

20 Claims, 5 Drawing Sheets

COLLISION-AVOIDANCE DEVICE FOR AIRCRAFT, NOTABLY FOR AVOIDING COLLISIONS WITH THE GROUND

BACKGROUND OF THE INVENTION

The present invention relates to a collision-avoidance device for aircraft, notably for avoiding collisions with the ground. It can be applied notably to airliners. More generally, it can be applied to all aircraft that, in the course of their flight, come far too close to the ground, when they are in the vicinity of mountains for example, or have to maneuver in sectors of air space where they are a source of danger or are themselves in danger, in prohibited zones for example.

There are known devices for the avoidance of collisions between the ground and aircraft. These devices are characterized chiefly by the use of radio altimeters, computers giving the barometric height from measurements of pressure and temperature, and navigation means such as an inertial unit or a system of flight management. The principle of these devices lies in the use of an altimetrical height, taken with reference to the ground, and in the use of the variations of the radioaltimetrical or barometrical height. The latter height is used notably because of its higher precision for great heights as compared with the variation in altimetrical height. These distances from the ground are compared with threshold values that themselves depend on the values of heights and on the configuration of the aircraft, depending on whether its undercarriage or flaps are extended for example. When the parameters measured, namely the heights and variations of heights as a function of time notably, exceed the threshold values, an alarm is sent to the crew. However, such devices have the drawback of giving measurements that are far too late with respect to the progress of the aircraft, hence the drawback of generating alarms that come too late, preventing crews from reacting in time. Such devices are therefore liable not to prevent collisions. This fact may arise notably in the event of a sudden upward turn in the relief when the aircraft is moving towards the side of a steep mountain for example. Another drawback of known devices is the fact that they generate unwarranted alarms. These alarms may occur notably when the aircraft are flying over low-altitude mountains with a good safety height but where the upward turns in the relief, albeit harmless, give rise to these false alarms. These false alarms seriously reduce the credibility of these anticollision devices.

Improvements have been made to these devices, notably by introducing data bases by which the value of the thresholds to be taken into account can be modulated as a function of the geographical position of the aircraft. These improvements are liable to diminish the false alarms. However, they necessitate data bases adapted to each type of terrain. Continuing along the lines of this last-mentioned approach, it is possible to envisage having a digital model of the terrain that would make it possible to have permanent knowledge, as a function of its position, of the nature of the relief towards which the aircraft is flying. Nonetheless, the use of such a model calls for a data base that describes the relief with sufficient precision and that therefore requires larger-sized memories. In addition to this drawback, a data base such as this needs exchange procedures and updatings, and this fact complicates its use. The large number of information elements stored furthermore implies non-negligible risks of error.

The aim of the invention is to overcome the above-mentioned drawbacks, notably by eliminating the hazards related to variations in relief and by determining the position of the aircraft no longer with respect to the ground but with respect to known safety altitudes.

SUMMARY OF THE INVENTION

To this effect, an object of the invention is a collision-preventing device for an aircraft, said device comprising:

means for the geographical localization of the aircraft;

a data base containing a description of safety altitudes;

means for the building, by computation, of an air floor about the vertical to the aircraft, as a function of the geographical localization of the aircraft, these means being connected to the means of localization and to the data base, the altitude of the floor being greater than or equal to the safety altitudes about the vertical of the aircraft;

means to predict the position in the air of the aircraft between a first given instant and a second given instant, connected to the means of localization, the altitude of the aircraft being known at the first given instant;

means to compare the predicted air position of the aircraft with the floor that is built, these means being connected to the prediction means and to the building means, an alarm being triggered when the result of the comparison indicates that an air position of the aircraft is beneath the floor.

The main advantages of the invention are that it enables the prediction of collision risks and therefore contributes to reducing the reaction times of crews to these risks, reduces false alarms, improves the reliability of anti-collision systems and can be adapted to all types of reliefs, air space sectors and navigation constraints.

BRIEF DESCRIPTION OF THE DRAWINGS

Other features and advantages of the invention shall appear in the course of the following description, made with reference to the appended drawings, of which.

MORE DETAILED DESCRIPTION

Figure 1:
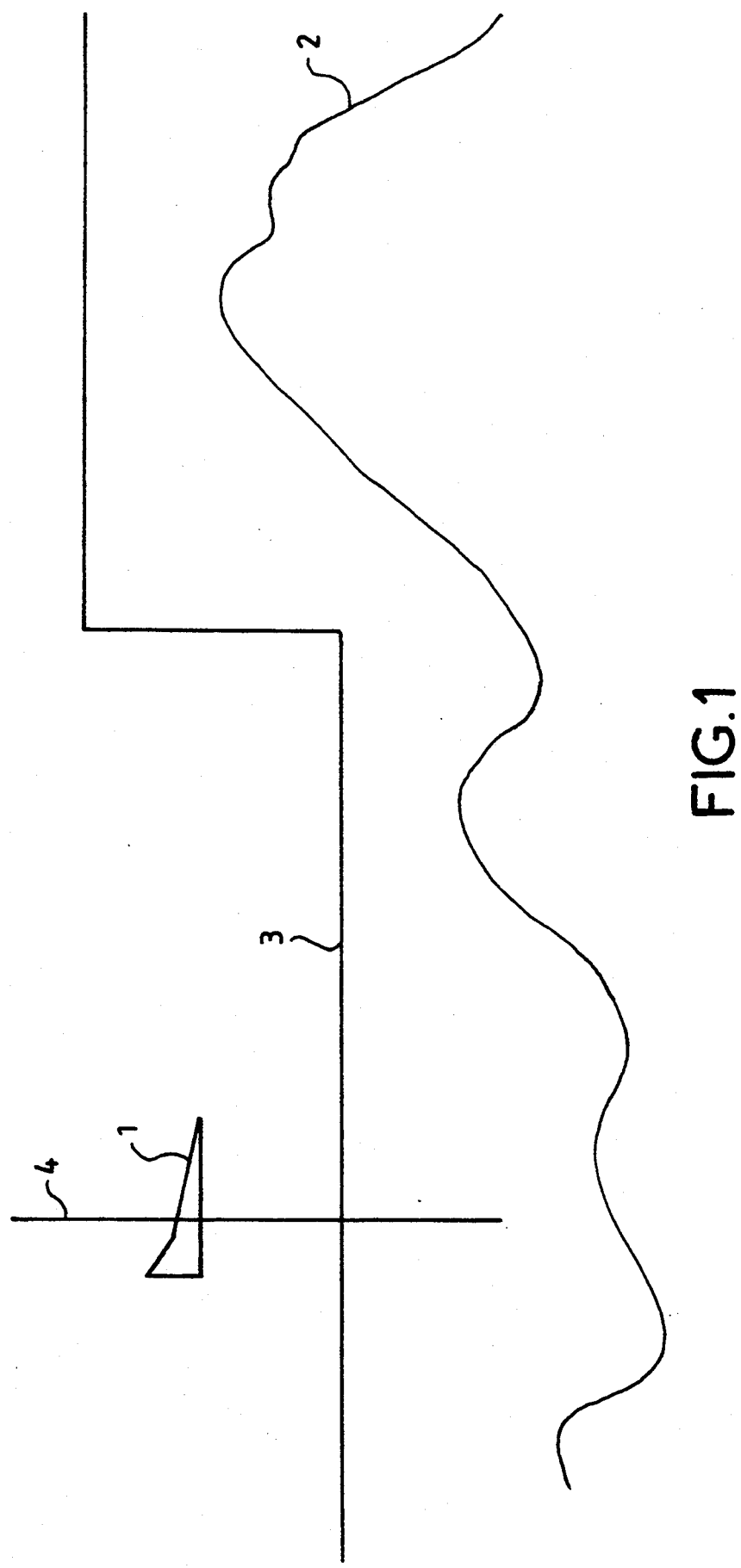
FIG. 1 illustrates the principle of operation of a device according to the invention.

FIG. 1 illustrates the principle of operation of a device according to the invention. A description of the safety altitudes of the aircraft 1 is stored. These altitudes are, for example, defined with respect to the relief of the terrain 2, with respect to prohibited air space zones or with respect to flight or landing procedures. Depending on the geographical localization of the aircraft, and as a function of the description of the safety altitudes, an air floor 3 is built around the vertical 4 of the aircraft, the floor actually constituting an air boundary for the aircraft beneath which there is a possible risk of collision. If the geographical localization of the aircraft is an approach to an airport, the description of the safety altitudes leads to a type of floor taking account notably of the landing procedures. If this localization is in a mountainous region, the relief is taken into consideration. The floor 3 does not follow the irregularities of the relief of the terrain 2, but is defined for example by an overall altitude. This overall altitude is, however, defined locally. In the event of a upturn of the terrain 2, the floor 3 gets defined by a new overall altitude that is greater than the peak point of the relief. In the event of landing, this overall altitude is defined successively by the different minimum landing altitudes as well as by the landing paths for example.

Figure 2:
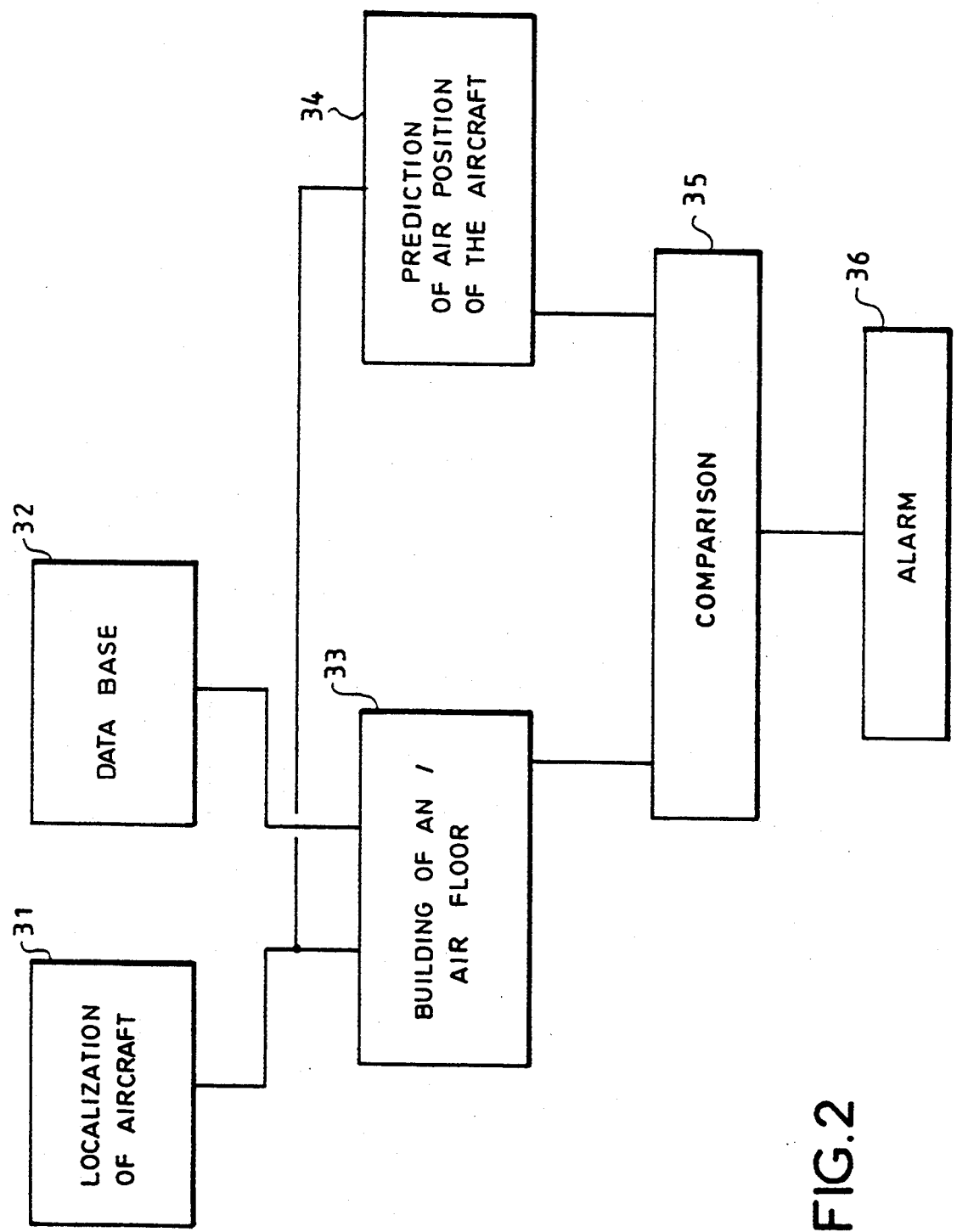
FIG. 2 shows a block diagram of a device according to the invention.

FIG. 2 is a block diagram of a device according to the invention. This device comprises at least means 31 to localize the aircraft that contain them and a data base 32 storing notably a description of safety altitudes. Means for the building, by computation, of an air floor about the vertical of the aircraft 33 are connected to the localization means 31 and to the data base 32. Using the geographical localization of the aircraft defined by the localization means 31 and the safety altitudes as a function of the geography of the regions flown over, stored by the data base 32, the building means define an air floor beneath which there is a risk that the aircraft may enter into collision or is no longer in a condition of safety. This air floor is, for example of the type represented by the floor 3 of FIG. 1.

Means to predict the air position of the aircraft 34, notably the vertical component of its position, are connected to the localization means 31. These prediction means 34 assess the air position of the aircraft between a first given instant to, which is for example that of the building of the air floor 3 about the aircraft, and a second given instant to $+\Delta t$. Between each operation of building floors, several predictions of states of the aircraft may be made for example. This prediction is made notably from the known position of the aircraft, the geographical localization and the vertical component of its position, at the first given instant and its speed vector at this instant.

Comparison means 35 are connected to the building means 33 and to the prediction means 34. These comparison means 35 compare the predicted situation of the aircraft with the air floor built at the first instant to. If the predicted situation of the aircraft is above the air floor, it is deemed to be in a position of safety. If not, there is a possible risk of collision and an alarm 36 connected to the comparison means is triggered.

Figure 3:
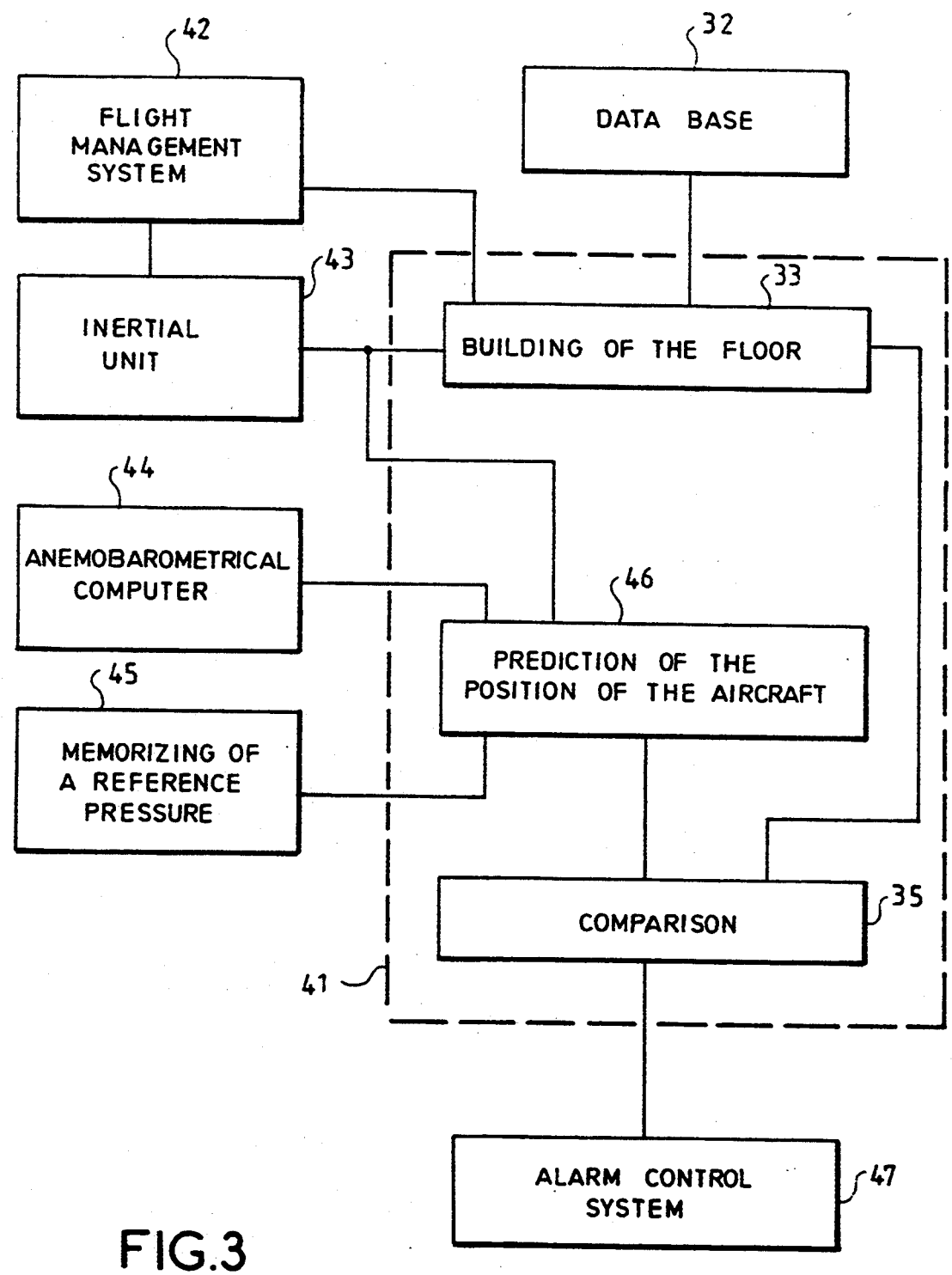
FIG. 3 shows a possible embodiment of a device according to the invention.

FIG. 3 shows possible embodiments of the above-mentioned means. The building of the floor, the prediction of the situation of the aircraft and above-mentioned comparison are, for example, carried out by a single computer 41. However, a computer could be assigned to each of the foregoing functions. The means for the localization of the aircraft are constituted, for example, by the flight management system 42 and the inertial unit 43 of the aircraft. The localization of the aircraft, namely its longitude and its latitude, is normally defined by the flight management system 42 which uses the information elements given by the inertial unit 43 and by sensors known to those skilled in the art. In the event of a malfunction of the system 42, the system 43 may give the above-mentioned data elements.

The data base 32 contains notably all the information elements that can be used to define the floors pertaining to the flight of the aircraft, namely a description of the safety altitudes to be met, which are notably a function of the reliefs overflown, the prohibited air zones and the flight procedures for landing or take-off. To this end, it contains, for example, a description of the navigation beacons for each airport as well as their geographical positions, a description of approach procedures for each airport and a description of the minimum safety heights to be met when there is no airport in the vicinity or when the aircraft is cruising. The data base 32 may contain, for example, a description of the airports throughout the world.

The description of the approach procedures is constituted, for example, by a certain number of rectilinear segments or is in the shape of an arc for which the initial point and the final point are given in terms of absolute position, i.e. in terms of latitude or longitude or in terms of relative position with respect to a navigation beacon, as well as the safety heights to be met when passing between these two points.

The description of the minimum safety heights may be obtained by taking, for example, a grid layout corresponding to the lines of the parallels and to the; meridians of the earth's surface and by assigning a minimum safety height value to each square.

Another approach to organizing the data base 32 consists in storing all the safety altitudes instead of the above-mentioned descriptions. Nevertheless an organization such as this notably requires more memory space. By contrast, it may have the advantage of reducing the computation time or the floor building time.

The floor building means 33 form part of the computer 41. Said computer 41 makes a computation for example of the floors around the aircraft as a function of the data elements transmitted by the flight management system 42 and the inertial unit 43, firstly for the definition of the localization of the aircraft and, secondly, for the definition of the safety heights to be respected as a function of the geographical localization of the aircraft. Here, the height of the floor should not be less than these safety heights.

The means for predicting the air position of the aircraft are constituted for example by the inertial unit 43, an anemobarometrical computer 44, a reference pressure storage means 45 and a part 46 of the computer 41. This part 46 is assigned to the computation of the air position of the aircraft as a function of the speed vector of said aircraft given by the inertial unit and the air position of the aircraft at a first instant to. The situation of the aircraft, defined notably by the vertical component of its position, is for example determined by the level of atmospheric pressure at which the aircraft is located. Each pressure value is related to an altitude, independently notably of the irregularities of relief of the zone overflown by the aircraft without taking account of upturns in relief that are not dangerous or are insignificant. To this effect, the anemobarometrical computer 44 computes a pressure value from which the part 46 of the computer 41, assigned to prediction, deduces an altitude as a function of the reference pressure stored in the storage means 45. This pressure is, for example, the ground pressure or the QNH pressure known to those skilled in the art. The storage means 45 are updated throughout the journey of the aircraft as a function of new reference pressures to be taken into account. At an approach to an airport, the reference pressure may be, for example, given to the pilot from the airport.

The prediction of the air position of the aircraft is, for example, carried out by the computer 41 on the basis of the speed vector of the aircraft given by the inertial unit 43 at the first given instant to and from the known position of the aircraft at this first instant, i.e. from its latitude and longitude given by the flight management system 42, its altitude computed by means of the anemobarometrical computer 44 and the reference pressure 45. The computer 41 applies, for example, a model for the prediction of a so-called avoidance trajectory describing the air position of the aircraft. This model uses for example a speed vector, referenced $\bar{V}$, of the aircraft, a delay time referenced $\delta t$, and a resource of the aircraft, referenced G, with a maximum load factor of this aircraft for example. This resource notably defines the capacity of the aircraft to pull the nose up. The avoidance trajectory is therefore obtained, for example, by a straight line segment that is colinear with the speed vector $\bar{V}$ and has a length equal to the product $V.\delta t(1)$, then by a curve that substantially represents, for example, an arc of a circle that is tangential to the foregoing segment, pointed upwards, and a radius R such that $G = (V^2/R)+1$ (2), V representing the modulus of the speed vector $\bar{V}$.

When the avoidance trajectory model leads to a situation where some of its points are found below the floor calculated earlier, the device according to the invention activates, for example, an alarm which may be a visual alarm or a sound alarm, in order to warn the crew of the imminent presence of the aircraft in an unsafe zone.

The computer means 35 are, for example, part of the computer 41. This computer 41 compares the predicted aircraft position with the floor calculated by the floor building means 33. It is connected, at output, to an alarm control system 47 that it activates notably when a trajectory goes beneath a floor.

Figure 4:
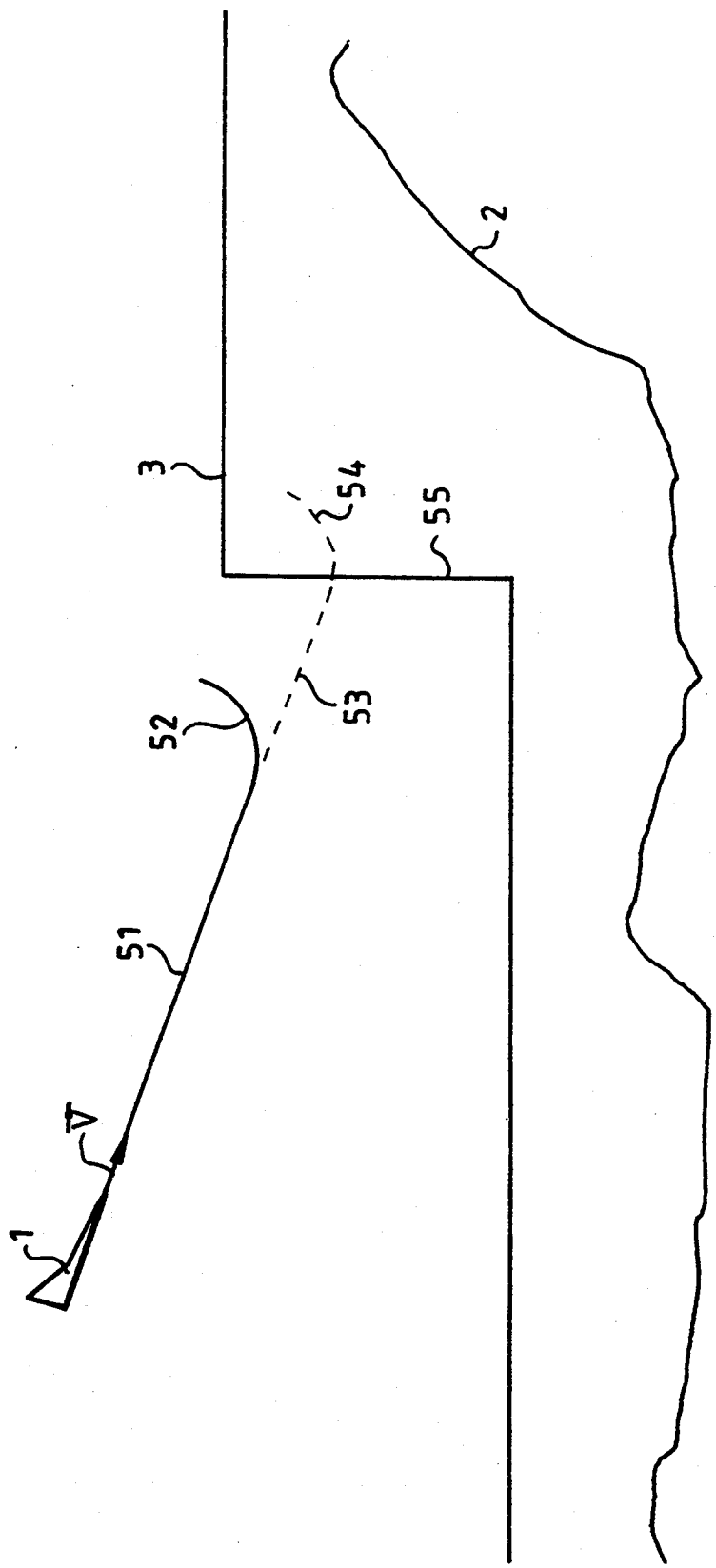
FIG. 4 shows two examples of predicted trajectories of an aircraft.

FIG. 4 shows two examples of avoidance trajectories computed in relation to the aircraft 1 overflying the terrain 2, beneath which there is defined the floor 3, computed for example by the computer 41. A first trajectory, computed notably as a function of the speed vector $\bar{V}$ of the aircraft 1, is constituted by a segment 51 that is colinear with the speed vector $\bar{V}$ and a curve representing for example substantially an arc of a circle 52 tangential to the radius 51. This segment 51 and this curve 52 are then, for example, computed in accordance with the foregoing relationships (1) and (2). This first trajectory 51, 52 does not go beneath the floor 3. A second trajectory is constituted for example by a segment 53 extending the foregoing segment 52 and an arc of a circle 54. This second trajectory 53, 54 goes beneath the floor 3, for example because the excessive speed of the aircraft 1 which prevents the aircraft from rising before the upward turn 55 of the floor 3, said upward turn being due notably to an elevation of the relief of the terrain 2. This upward turn 55 is for example vertical. In this case, an alarm, for example, warns the crew that the aircraft 1 should be made to take up altitude or that it should be made to change its trajectory. Indeed, the avoidance trajectories 51, 52, 53, 54 are notably trajectories that leave the aircraft a reaction time to avoid having to go beneath the floor 3 and hence to remain in a situation of safety. Following a reaction of the aircraft due to an avoidance trajectory 53, 54 passing beneath the floor 3, another prediction of an avoidance trajectory is for example carried out to verify the path of this new trajectory and to verify notably that it is entirely above the floor 3.

This floor 3 is computed by the building means 33 or the computer 41 throughout the flight of the aircraft 1.

The time between the computation of two successive floors depends notably on the speed of the aircraft. These computations may be done periodically for example, the period being such that two floors computed successively overlap at least slightly in order to prevent zones of uncertainty. Predictions of the air position of the aircraft are, for example, carried out periodically so as to enable the crew to react permanently to a risk of collision.

The computation of the floor has been defined here above on the basis of the values of atmospheric pressure defining altitudes, which are notably independent of the irregularities of relief overflown by the aircraft. It is possible, for example, that the altitudes defining the floors do not use atmospheric pressures. These altitudes may be given by a GPS receiver from a system constituted by several geostationary satellites associated with a geoid model. The number of satellites may be four for example. These GPS receivers, known to those skilled in the art, make it possible, by means of a reference geoid model describing the earth, to measure the altitude of an aircraft. GPS are the initials for Global Positioning System. Since the GPS receiver is contained in the aircraft, it receives signals coming from four satellites enabling a computer, for example the above-mentioned computer 41, to determine the altitude of the aircraft.

Figure 5:
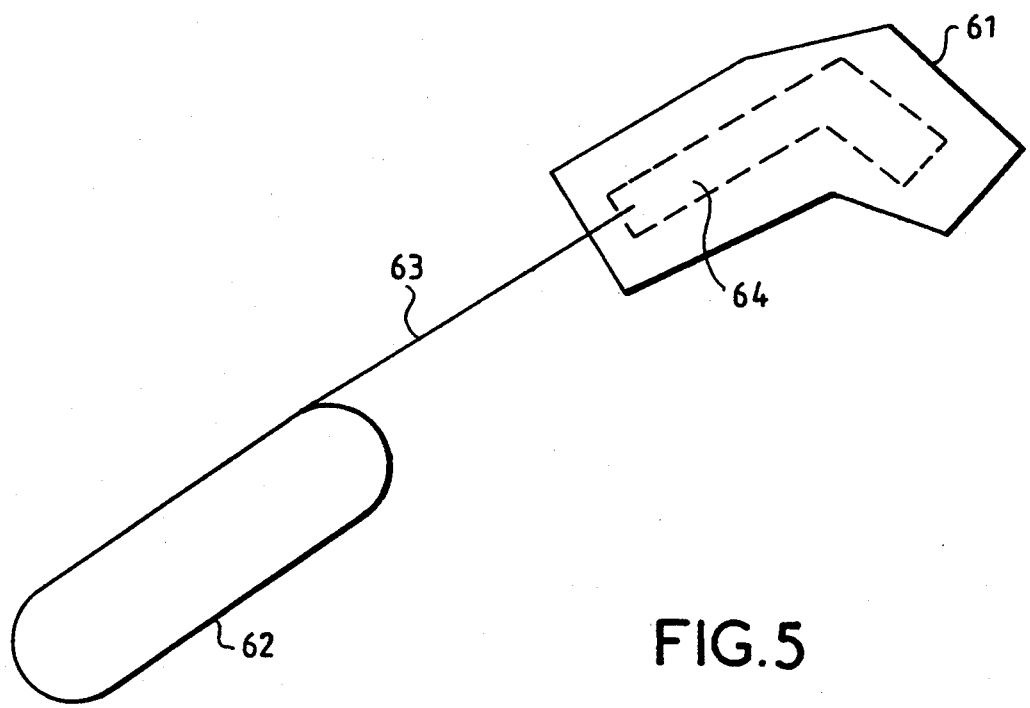
FIGS. 5 and 6 show an exemplary application of the device according to the invention.
Figure 6:
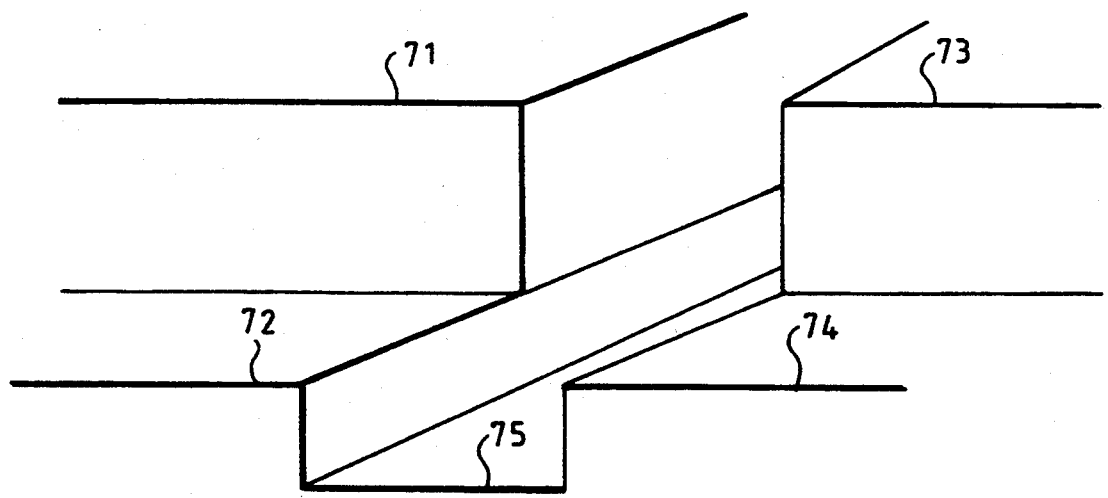

FIGS. 5 and 6 show an exemplary application of the device according to the invention in a position of approach to an airport.

When approaching an airport 61 as shown in FIG. 5, an aircraft containing the device according to the invention takes a closed holding pattern 62 before entering a landing path in order to land on a runway 64. From all the information elements contained in the data base 32, and notably from the procedures of approach and the safety procedures and safety altitudes to be respected, the building means 33, the prediction means 46 for example, define a floor for which one part is shown in FIG. 6.

This floor is constituted by several constant altitudes 71, 72, 73, 74, 75, each one of which is greater than or equal to the safety altitude that must be respected by each of them. The part 75 of the floor having the lowest altitude constitutes for example a part of the floor of the landing corridor 63.

The certainty of operation of the device according to the invention can be increased by associating with it, for example, a radio altimeter for the verification of altitudes. When these altitudes are defined by measurements of pressures, a GPS receiver can also be used to ascertain the altitude of the aircraft with respect to a reference geoid.

The floors 3, 71, 72, 73, 74, 75 defined about the vertical to the aircraft 1 have, for example, a finite number of levels of altitudes as can be seen in FIGS. 1 and 6. It is possible to envisage floors with continuously variable altitudes. Such floors make it possible, notably, for the device according to the invention to be operational practically up to the landing of the aircraft on the ground.

What is claimed is:

1. A collision-preventing device for an aircraft, said device comprising:
   means for locating a geographical location of said aircraft;
   a data base containing a description of safety altitudes as a function of at least geographical locations, wherein said description of safety altitudes is at least a function of elevation points of an area on a surface of the earth in a vicinity of said aircraft so that a single safety altitude encompasses a region in said area having a plurality of elevation points, said single safety altitude being greater than a maximum elevation means for computing an air floor between said aircraft and said region, said computing means being connected to said locating means and to said data base, wherein said air floor is a function of the geographical location of said aircraft and said description of safety altitudes, wherein an overall altitude of said floor is greater than or equal to said safety altitudes between said aircraft and said surface of the earth, said floor being computed throughout a flight of said aircraft and encompassing a plurality of said safety altitudes within said region;

means for predicting an air position of said aircraft between a first given instant and a second given instant, said predicting means being connected to said locating means, wherein an altitude of said aircraft is known at said first given instant;

means for comparing said predicted air position of said aircraft with said floor, said comparing means being connected to said prediction means and to said computing means; and an alarm connected to said comparing means, said alarm being triggered when a result of said comparing means indicates that said predicted air position of said aircraft is beneath said floor.

2. A device according to the claim 1, wherein said means for predicting predicts said altitude of said aircraft by using a pressure level.

3. A device according to claim 2, wherein said predicting means comprises an anemobarometrical computer and storing means for storing of a reference pressure value.

4. A device according to claim 1, wherein said predicting means predicts said altitude of said aircraft by using signals transmitted by geostationary satellites.

5. A device according to claim 1, wherein said locating means comprises a flight management system and an inertial unit of said aircraft.

6. A device according to claim 1, wherein said data base comprises a description of navigation beacons of each of a plurality of airports, a description of approach procedures for each of said airports and a description of minimum safety heights to be respected when no airport is in said vicinity, said minimum safety heights being greater than a peak point of said region.

7. A device according to claim 6 wherein said description of the minimum safety heights is an elevation value associated with regions defined by parallel lines and meridian lines of the earth's surface.

8. A device according to claim 1, wherein said predicting means predicts said air position of said aircraft by determining a trajectory constituted by a segment colinear with a speed vector of said aircraft and a curve that is substantially an arc of a circle tangential to said segment and pointed upwards, said segment being proportional to a speed of said aircraft and a radius of an arc of a circle being a function of a square of said speed of said aircraft and a capacity of said aircraft to gain altitude, said capacity of said aircraft to gain altitude being a function of resources of said aircraft including said speed and a load factor.

9. A device according to claim 1, wherein said computing means periodically computes a new floor.

10. A device according to claim 1, wherein said predicting means periodically predicts a new air position of the aircraft.

11. A device according to claim 1, further comprising an altimeter connected to said predicting means.

12. A device according to claim 1, wherein said computing means updates said overall altitude of said floor to a new overall altitude if a new safety altitude is greater than said overall altitude.

13. A device according to claim 1, wherein said computing means successively updates said overall altitude of said floor by new overall altitudes in the event of a landing, said new overall altitudes being a function of a landing path.

14. A device according to claim 1, wherein said data base comprises information used for computing said floor throughout a flight of said aircraft.

15. A device according to claim 14, wherein said information comprises a description of airports throughout the world.

16. A device according to claims 14, wherein said information comprises prohibited air zones and flight procedures, said flight procedures comprising procedures for approach to an airport, procedures for landing and procedures for take-off of said aircraft.

17. A device according to claim 16, wherein said flight procedure for approach is constituted by rectilinear segments and arcs with safety heights between an initial point and a final point.

18. A device according to claim 17, wherein said initial and said final points are defined in terms of an absolute position of said aircraft, said absolute position being a value of latitude and longitude.

19. A device according to claims 17, wherein said initial and said final points are defined in terms of a position relative to a navigation beacon.

20. A collision-preventing device for an aircraft, said device comprising:

means for locating a geographical location of said aircraft;

a data base containing safety altitudes associated with all regions of the earth as a function of at least geographical locations, wherein each of said, safety altitudes is at least a function of elevation points of a region on a surface of the earth in a vicinity of said,aircraft so that a single safety altitude encompasses, said region having a plurality of elevation points, said single safety altitude being greater than a maximum elevation point in said region;

means for computing an air floor between said aircraft and said region, said computing means being connected to said locating means and to said data base, wherein said air floor is a function of the geographical location of said aircraft and said description of safety altitudes, wherein an overall altitude of said floor is greater than or equal to said safety altitudes between said aircraft and said surface of the earth, said floor being computed throughout a flight of said aircraft and encompassing a plurality of said safety altitudes within said region;

means for predicting an air position of said aircraft between a first given instant and a second given instant, said predicting means being connected to said locating means, wherein an altitude of said aircraft is known at said first given instant;

means for comparing said predicted air position of said aircraft with said floor, said comparing means being connected to said prediction means and to said computing means; and an alarm connected to said comparing means, said alarm being triggered when a result of said comparing means indicates that said predicted air position of said aircraft is beneath said floor.

* * * * *